United States Patent [19]
Kerst et al.

[11] 3,765,864
[45] Oct. 16, 1973

[54] CONTROLLING ALGAE WITH 5-(5 BARBITURILIDENE)-RHODANINE

[75] Inventors: Al F. Kerst; John D. Douros, Jr., both of Littleton; Milan Brokl, Denver, all of Colo.

[73] Assignee: The Gates Rubber Company, Denver, Colo.

[22] Filed: Aug. 26, 1971

[21] Appl. No.: 175,341

[52] U.S. Cl............................ 71/67, 71/90, 260/257
[51] Int. Cl................................................. A01n 9/12
[58] Field of Search ................. 71/67, 90; 424/254; 260/257

Primary Examiner—Lewis Gotts
Assistant Examiner—Catherine L. Mills
Attorney—Raymond Fink et al.

[57] ABSTRACT

The compound 5-(5'-Barbiturilidene)-Rhodanine can be used to inhibit and/or prevent the growth of many undesirable forms of algae. This invention is particularly concerned with the algaecidal properties of 5-(5'-barbiturilidene)-rhodanine against the algae species *Scenedesmus, Plectonema, Anabaena, Ankistrodesmus, Oscillatoria, Coccochloris, Chlamydomonas, Lyngbya, Synura,* and *Chlorella.*

13 Claims, No Drawings

CONTROLLING ALGAE WITH 5-(5 BARBITURILIDENE)-RHODANINE

BACKGROUND OF THE INVENTION

The demand for both general and selective algaecides has become more acute as greater demands are put upon existing water supplies. The chemical arts have produced a variety of compounds which have proved to be useful in controlling many algae species responsible for various nuisance and health problems. Water treatment researchers such as Palmer, C. and Maloney, T., Ohio Jour. of Sci., 55, 1 (1955) and Sawyer, C., Jour. of Water Pollution Control Federation, 34,279 (1962) have reported the use of a wide variety of chemical algaecides such as copper sulphates, chlorine, quaternary ammonium, rosin amines, quinones, activated silver, antibiotics and organic zinc compounds. Representative patented algaecidal compounds can be found in U.S. Pat. Nos. 2,999,810; 3,052,594; 3,396,158 and 3,481,730. Furthermore many microorganism inhibiting compounds contain the barbituric acid nucleus;

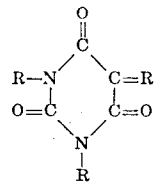

wherein R represents various substituents. Representative biologically active barbituric compounds are found in U.S. Pat. Nos. 2,561,688; 2,605,209; 2,725,380; 2,820,035, 2,887,487 and 3,102,072. The algaecidal properties of 5-(5'-barbiturilidene)-rhodanine however, have not been previously discovered.

SUMMARY OF THE INVENTION

According to the present invention, it has been found that 5-(5'-barbiturilidene)-rhodanine

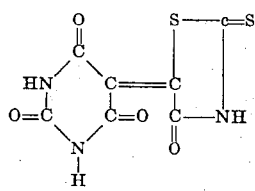

compounds are very effective algaecidal agents. The compound 5-(5'-bariturilidene)-rhodanine has been known to the chemical arts for many years. The 5-(5'-barbiturilidene)-rhodanine used in this invention is prepared by a procedure whereby 16.00 gr. (0.1 mole 1 of alloxan-monohydrate and 13.32 gr. (0.1 mole) of rhodanine are condensed in 150 ml. of glacial acetic acid. The reaction is carried out in a reflux condenser for about 3 hours with continuous stirring. The temperature is controlled by a water bath and maintained at 60°–70° C. After the reaction time, a yellow solution of the product is evaporated under vacuum to about one-third of the original volume and diluted with the same amount of water, and allowed to stand in a refrigerator overnight. The product forms yellow crystals and is separated on a sintered glass funnel and washed thoroughly with small amounts of water. A small part of the compound is obtained from the filtrate after evaporation at a diminished pressure and treatment with water. The crude product is purified by recrystallization from methanol with carbon treatment yielding a product (13.2 g., 51.36 percent of theoretical) which has a melting point of 172°–175° C.

UTILITY OF THE INVENTION

The presence of algae in water can result in such deleterious effects as rampant plant growth, health hazards, discoloration, bad taste and odor as well as blockage of pipes, filters, tanks and similar equipment. The applicants have discovered that 5-(5'-barbiturilidene)-rhodanine compounds can be used to inhibit the growth of a wide variety of algae species which cause these problems in water supplies. For example 5-(5'-barbiturilidene)-rhodanine compounds may be employed against: (1) taste and odor causing algae such as *Anabaena* and *Synura;* (2) filter clogging algae such as *Chlorella, Oscillatoria,* and *Anabaena;* (3) polluted water algae such as *Lyngbya, Chlamydomonas, Anabaena* and *Oscillatoria,* (4) clean water algae such as *Ankistrodesmus* and (5) surface water algae such as *Scenedesmus*.

DESCRIPTION OF THE PREFERRED EMBODIMENTS

The algaecidal effectiveness of 5-(5'-barbiturilidene)-rhodanine against these species is determined by the following test. Algal cultures representing *Scenedesmus, Chlorella, Plectonema, Anacystis, Ankistrodesmus, Anabaena, Synura, Oscillatoria, Chlamydomonas, Coccochloris* and *Lyngbya* are each maintained in Chu No. 10 Broth Medium (Calcium nitrate, 0.040 grams; Potassium phosphate, 0.010 grams; Magnesium sulphate, 0.025 grams; Sodium carbonate, 0.020 grams; Sodium silicate, 0.025 grams; Ferric citrate, 0.003 grams; Citric acid, 0.003 grams and deionized water, 1,000 ml.) in the presence of sunlight. Hardened Chu No. 10 Agar plates are inoculated with cotton swabs saturated with the respective algae broth cultures. The 5-(5'-barbiturilidene)-rhodanine is tested by impregnating filter paper discs (1.27 cm. in diameter, No. 740-E. Schleicher and Schuell, Keene, New Hampshire) with 0.08 ml. of a 5-(5'-barbiturilidene)-rhodanine solution. The saturated filter discs are placed on the surface of the seeded agar plates and the optimum broth temperature of 25° to 27° C. is maintained. Untreated controls are used as a basis of comparison and these exhibit profuse algae growth. The results of these tests are expressed as inhibition zone diameters in centimeters.

Algal Screen

| Compound: 5-(5'-barbiturilidene) rhodanine Algae | Zones of Inhibition for Various Concentrations | | |
|---|---|---|---|
| | 100 ug/disc | 10 ug/disc | 3 ug/disc |
| *Scenedesmus basilensis* Taft EEC - 83 | 3.4 | 2.4 | 1.3 |
| *Scenedesmus obliquus* Taft EEC - 92 | 2.2 | 1.5 | tr |
| *Scenedesmus obliquus* SRI | 2.2 | 1.3 | tr |
| *Chlorella vulgaris* ATCC - 9765 | 2.7 | 1.5 | tr |
| *Plectonema notatum* Taft EEC - 172 | 1.8 | 1.1 | tr |
| *Anacystis nidulans* Taft EEC - 134 | 1.4 | tr | tr |
| *Ankistrodesmus* var. *acicularis* Taft EEC - 28 | 1.8 | 1.0 | tr |
| *Anabaena catenula* SRI | 3.0 | 2.1 | 1.0 |
| *Synura ulvella* UI | 3.1 | 2.2 | 1.1 |
| *Oscillatoria corneti* UI | 3.4 | 2.5 | 1.3 |
| *Coccochloris elebans* SRI | 2.0 | 1.1 | tr |

| | | |
|---|---|---|
| Chlamydomonas radiati UA | 1.7 | 1.0 |
| Lyngbya sp. Taft | | |
| EEC - 166 | | | tr = trace

Those skilled in the art will recognize that the scope of this invention should not be limited to the particular species of the above genera. For instance, the noted activity of 5-(5'-barbiturilidene)-rhodanine against Chlorella vulgaris suggests that the compound will also prove to be of value against such other Chlorella species such as *Chlorella ellipsoidea*, *Chlorella pyrenoidosa*, *chlorella variegate*, etc. Similar possibilities exist for species of the other genera whose activity was shown to be arrested by 5-(5'-barbiturilidene)-rhodanine. It should also be recognized that other appropriate algae genera may well afford additional opportunities to further define the degree and spectrum of the algaecidal activity disclosed in this invention. Since no firm procedure can be laid down for the sequencing of such evaluations or for a selection among the more than 20,000 known algae species, the 5-(5'-barbiturilidene)-rhodanine compounds of this invention must be considered on the basis of their demonstrated performance in these primary evaluations and then progressively judged in subsequent studies.

Subsequent evaluations should include but not be limited to the following algae genera.

Taste and Odor Causing Algae Genera

| | | |
|---|---|---|
| Asterionella | Peridinium | Nitella |
| Anabaena | Mallomonas | Dinobryon |
| Microcystis | Aphanizomenon | Volvox |
| Uroglenopsis | Staurastrum | Pandorina |
| Hydrodictyon | Ceratium | Synura |
| Synedra | Coelosphaerium | |

Clean Water Algae Genera

| | | |
|---|---|---|
| Rhizoclonium | Merismopedia | Meridion |
| Pinnularia | Aphanothece | Chromulina |
| Cladophora | Ulothrix | Phacotus |
| Rhodomonas | Navicula | Staurastrum |
| Surirella | Chamaesiphon | Lemanea |
| Cyclotella | Micrasterias | Cocconeis |
| Chrysococcus | Calothrix | Microcoleus |
| Ankistrodesmus | | |

Polluted Water Algae Genera

| | | |
|---|---|---|
| Arthrospira | Tetraedron | Anabaena |
| Merismopedia | Euglena | Phacus |
| Phormidium | Spirogyra | Gloeogapsa |
| Carteria | Chlorococcum | Stigeoclonium |
| Lepocinclis | Oscillatoria | Gomphonema |
| Nitzschia | Lyngbya | Chlamydomonas |
| Chlamydobotrys | | |

Filter Clogging Algae Genera

| | | |
|---|---|---|
| Anabaena | Closterium | Spirogyra |
| Chroococcus | Tabellaria | Trachelomonas |
| Dinobryon | Rivularia | Asterionella |
| Cymbella | Melosira | Palmella |
| Chlorella | Cyclotella | Diatoma |
| Synedra | Navicula | Fragilarai |
| Tribonema | Oscillatoria | |

Surface Water Algae Genera

| | | |
|---|---|---|
| Actinastrum | Euastrum | Zygnema |
| Nodularia | Gonium | Stauroneis |
| Coelastrum | Desmidium | Sphaerocystis |
| Euglena | Pediastrum | Scenedesmus |
| Micractinium | Eudorina | Oocystis |
| Mougeotia | Gomphosphaeria | |

Reservoir Algae Genera

| | | |
|---|---|---|
| Chara | Audouinella | Compsopogon |
| Phormidium | Tetraspora | Batrachospermum |
| Ulothrix | Achnanthes | Cymbella |
| Cladophora | Stigeoclonium | Bulbochaete |
| Gomphonema | Lyngbya | Draparnaldia |

It should also be recognized that the use of algaecidal 5-(5'-barbiturilidene)-rhodanine compounds should not be restricted to any particular area of application. The scope of this invention should encompass the use of 5-(5'-barbiturilidene)-rhodanine in waters of all types such as lakes, rivers, streams, reservoirs, ponds, oceans, as well as recirculating industrial waters. Furthermore, 5-(5'-barbiturilidene)-rhodanine compounds of the present invention are also advantageous in that they are biodegradable with none of the degradation products being toxic to fish and most fish food organisma at algae killing concentrations.

Another important advantage of 5-(5'-barbiturilidene)-rhodanine compounds in their algaecidal applications is that they can be made up in solid or liquid formulations. Examples of solid formulations are dust, wettable powders, granules and pellets known to the crop dusting art. Solid formulations, particularly floating solid formulations, may be preferred in combating algae which grow on surface waters. As a dust, 5-(5'-barbiturilidene)-rhodanine compounds may be dispersed in powdered solid carriers such as talc, soaps, soapstone, attapulgus clay as well as other finely divided solids. When formulated as wettable powders, the active 5-(5'-barbiturilidene)-rhodanine component may be employed in conjunction with inert fillers which may be of the clay type carrier or non-clay type, in conjunction with various combinations of wetting agents and emulsifiers which may permit the adaptation of the concentration as a free-flowing powder. Each of these carriers may contain one or more of the specified 5-(5'-barbiturilidene)-rhodanine compounds with other carriers which are ordinarily non-reacting or inert substances such as sand, clays, talc, sawdust, alkaline earth carbonates, oxides, phosphates and the like as well as diatomaceous earth, micas or other suitable materials.

When liquid formulations are desired, liquid extenders dilutants or carriers of non-reactive nature may be utilized. These compositions should contain approximately 0.1 to 20 percent by weight and preferably 1 to 10 percent and most preferably 1 to 3 percent of the active 5-(5'-barbiturilidene)-rhodanine ingredient. Solvents which may be used in the preparation of such compositions would include alcohols, ketones, glycols, mineral spirits and aromatic solvents such as benzene, xylene, nitrobenzene and dimethylformide. Furthermore, to assist in the rapid and complete dispersion in water systems, these 5-(5'-barbtiurilidene)-rhodanine compositions may also contain approximately 5 to 30 percent by weight and preferable 10 to 15 percent by weight of surface-active agents. Suitable surface-active agents include sodium dialkyl sulphates, sodium alkyl-benzene sulfonates, sodium carboxylates and nonionic surfactants such as ethoxylated fatty acid alcohols and amines.

Where it is desired to use wettable powders or liquid formulations, either emulsified, dispersed, or suspended in water or other fluids, one or more of the class of materials herein referred to as adjuvants may also be incorporated into the powder, dust or liquid formulation. These adjuvants may comprise surface active agents, detergents, wettable agents, stabilizers, dispersing agents, suspending agents, emulsifying agents, spreaders, stickers and conditioning agents generally. Through their modifying characteristics these adjuvants may facilitate handling application and may enhance or potentiate the 5-(5'-barbiturilidene)-rhodanine compounds of this invention in their algaecidal, bactericidal or fungicidal activities by mechanisms which are frequently not well understood. A satisfactory but not exhaustive list of these adjuvants appears in "Soap Chemical Specialties," Volume 31, No. 7, Page 61; No. 8, Pages 48 – 61; No. 9, Pages 52 – 67 and No. 10, Pages 38 – 67 (1955). See also bulletin No. 607 of the Bureau of Entomology and Plant Quarantine of the United States Department of Agriculture.

An additional advantage of the 5-(5'-barbiturilidene)-rhodanine compositions of this invention is their compatability with a wide variety of other algaecidal, biocidal and fungicidal materials. For example, it may be convenient to combine one or more of the 5-(5'-barbiturilidene)-rhodanine compositions with one or more of the other biocides, fungicies, or algaecides. For example, common fungicides and biocides such as sulphur, inorganic salts such as copper sulphate, activated colloidal compounds, copper naphthenate and zinc acetate as well as substituted hydrocarbons and quarternary ammonium compounds, amines and antibiotics may be employed in conjunction with 5-(5'-barbiturilidene)-rhodanine compounds.

It should be recognized that other considerations may make some methods of application more favored than others. These considerations may include the type of organisms on which the compound is to be administered, the degree of activity, the degree of inhibition toward the algae organism and the possible environmental side effects. Also to be considered is the cost of production and the characteristic solubility of the compounds into which the 5-(5'-barbiturilidene)-rhodanine may be introduced.

In their algaecidal aspects the Applicants have discovered that the 5-(5'-barbiturilidene)-rhodanine compounds of this invention are active algaecides at relatively low concentrations. For example, it has been discovered that the 5-(5'-barbiturilidene)-rhodanine have imparted a high degree of algaecidal activity at concentrations as low as 0.1 ppm. The amount of 5-(5'-barbiturilidene)-rhodanine added to the water will, of course, vary depending upon such factors as the type of algae present, the nature of the body of water, i.e., flowing stream versus small lake, etc., and the inherent ability of the body of water to support algae growth. This inherent ability in turn depends upon such factors as exposure to sunlight, PH, nutrient capabilities and the like. In most cases, however, the concentration of 5-(5'-barbiturilidene)-rhodanine required to kill or inhibit growth of algaes will vary from 0.1 to 100 ppm with the preferred range being 10 to 20 ppm.

The 5-(5'-barbiturilidene)-rhodanine compounds of this invention can be added to the water according to conventional techniques for algaecide application. When treating a lake or body of water which is relatively calm, the conventional procedure is to spray an aqueous solution of the algaecide over the surface of the water. The 5-(5'-barbiturilidene)-rhodanine generally will be predissolved in types of water soluble solvents previously mentioned. In the case of moving water, such as in water treatment plants or industrial facilities, 5-(5'-barbiturilidene)-rhodanine algaecides can be added to the water in small amounts at periodic intervals. For economic reasons, volume usages such as in lakes, streams and reservoirs as distinguished from specialized uses such as in aquatic gardens and industrial applications, the concentration of the 5-(5'-barbiturilidene)-rhodanine algaecides probably will not be over 100 ppm.

Having thus disclosed our invention, we claim:

1. A method of killing, preventing or inhibiting the growth of algae which comprises applying an effective algaecidal amount of 5-(5'-barbiturilidene)-rhodanine to the algae.

2. The method of claim 1 wherein the algae are selected from the group consisting of *Scenedesmus, Chlorella, Plectonema, Anacystis, Ankistrodesmus, Anabaena, Synura, Oscillatoria, Coccochloris, Chlamydomonas* or *Lyngbya*.

3. The method of claim 2 wherein the *Scenedesmus* is selected from the group consisting of *Scenedesmus basilensis* or *Scenedesmus obliquus*.

4. The method of claim 2 wherein the *Chlorella* is *Chlorella vulgaris*.

5. The method of claim 2 wherein the *Plactonema* is *Plectonema notatum*.

6. The method of claim 2 wherein the *Ankistrodesmus* is *Ankistrodesmus acicularis*.

7. The method of claim 2 wherein the *Anabaena* is *Anabaena catenula*.

8. The method of claim 2 wherein the *Synura* is *Synura ulvella*.

9. The method of claim 2 wherein the *Oscillatoria* is *Oscillatoria corneti*.

10. The method of claim 2 wherein the *Coccochloris* is *Coccochloris elebans*.

11. The method of claim 2 wherein the *Chlamydomonas* is *Chlamydomonas radiati*.

12. The method of claim 2 wherein the *Lyngbya* is *Lyngbya* TAFT EEC 166.

13. The method of killing algae selected from the group consisting of *Scenedesmus, Chlorella, Plectonema, Anacystis, Ankistrodesmus, Anabaena, Synura, Oscillatoria, Coccochloris, Chlamytomonas, Lyngbya*, which comprises adding to water containing said algae from 0.1 to 100 parts per million of water of 5-(5'-barbiturilidene)-rhodanine.

* * * * *